United States Patent
Takeuchi et al.

(10) Patent No.: US 7,019,780 B1
(45) Date of Patent: Mar. 28, 2006

(54) STEREOSCOPIC ZOOM LENS WITH SHUTTER ARRANGED BETWEEN FIRST AND SECOND LENS GROUPS

(75) Inventors: Koichi Takeuchi, Kanagawa (JP); Masami Himuro, Tokyo (JP); Ko Ishimoto, Tokyo (JP); Seisuke Ohba, Kanagawa (JP)

(73) Assignee: Sony Corporation, Tokyo (JP)

( * ) Notice: Subject to any disclaimer, the term of this patent is extended or adjusted under 35 U.S.C. 154(b) by 507 days.

(21) Appl. No.: 09/642,286

(22) Filed: Aug. 18, 2000

(30) Foreign Application Priority Data

Aug. 20, 1999 (JP) .......................... P11-234276

(51) Int. Cl.
*H04N 5/225* (2006.01)

(52) U.S. Cl. ...................... 348/340; 348/240.3; 348/49

(58) Field of Classification Search .................. 348/45, 348/49, 240.3, 240.99, 240.1, 207.99, 222.1, 348/335, 340, 342, 360, 361, 296, 297, 298, 348/311; 340/74, 76, 77, 193, 200; 396/452, 396/457, 458, 460, 462
See application file for complete search history.

(56) References Cited

U.S. PATENT DOCUMENTS

| | | | | |
|---|---|---|---|---|
| 3,890,628 A | * | 6/1975 | Gurtler ....................... 396/457 |
| 4,190,330 A | * | 2/1980 | Berreman ................... 349/200 |
| 4,686,572 A | * | 8/1987 | Takatsu ...................... 348/298 |
| 5,071,229 A | * | 12/1991 | Oaki et al. .................. 349/200 |
| 5,619,266 A | * | 4/1997 | Tomita et al. .............. 348/363 |
| 5,812,189 A | * | 9/1998 | Kimura et al. ......... 348/240.99 |
| 6,710,801 B1 | * | 3/2004 | Kubo ....................... 348/240.3 |
| 6,807,295 B1 | * | 10/2004 | Ono ............................. 348/42 |
| 2001/0012053 A1 | * | 8/2001 | Nakamura ................... 348/45 |

* cited by examiner

*Primary Examiner*—Wendy R. Garber
*Assistant Examiner*—Jason Whipkey
(74) *Attorney, Agent, or Firm*—Jay H. Maioli

(57) ABSTRACT

A lens unit and a camera capable of achieving stereoscopic television function and zoom function at the same time. More specifically, a lens unit (2) and a camera (1) each including at least a zoom lens (4), light quantity adjusting device (6 or 20), an electronic optical shutter provided on a stage of the zoom lens (4), and an optical shutter driving portion for controlling the electronic optical shutter (6) to open (6A, 6B) in a predetermined pattern.

16 Claims, 9 Drawing Sheets

1

FIG. 17
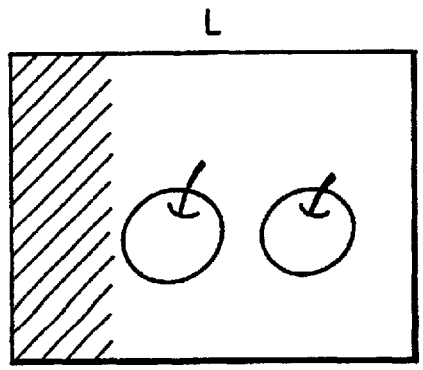
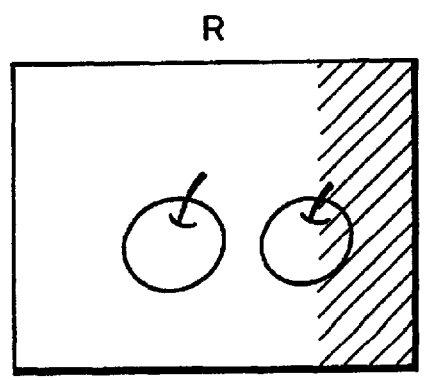

F I G. 16
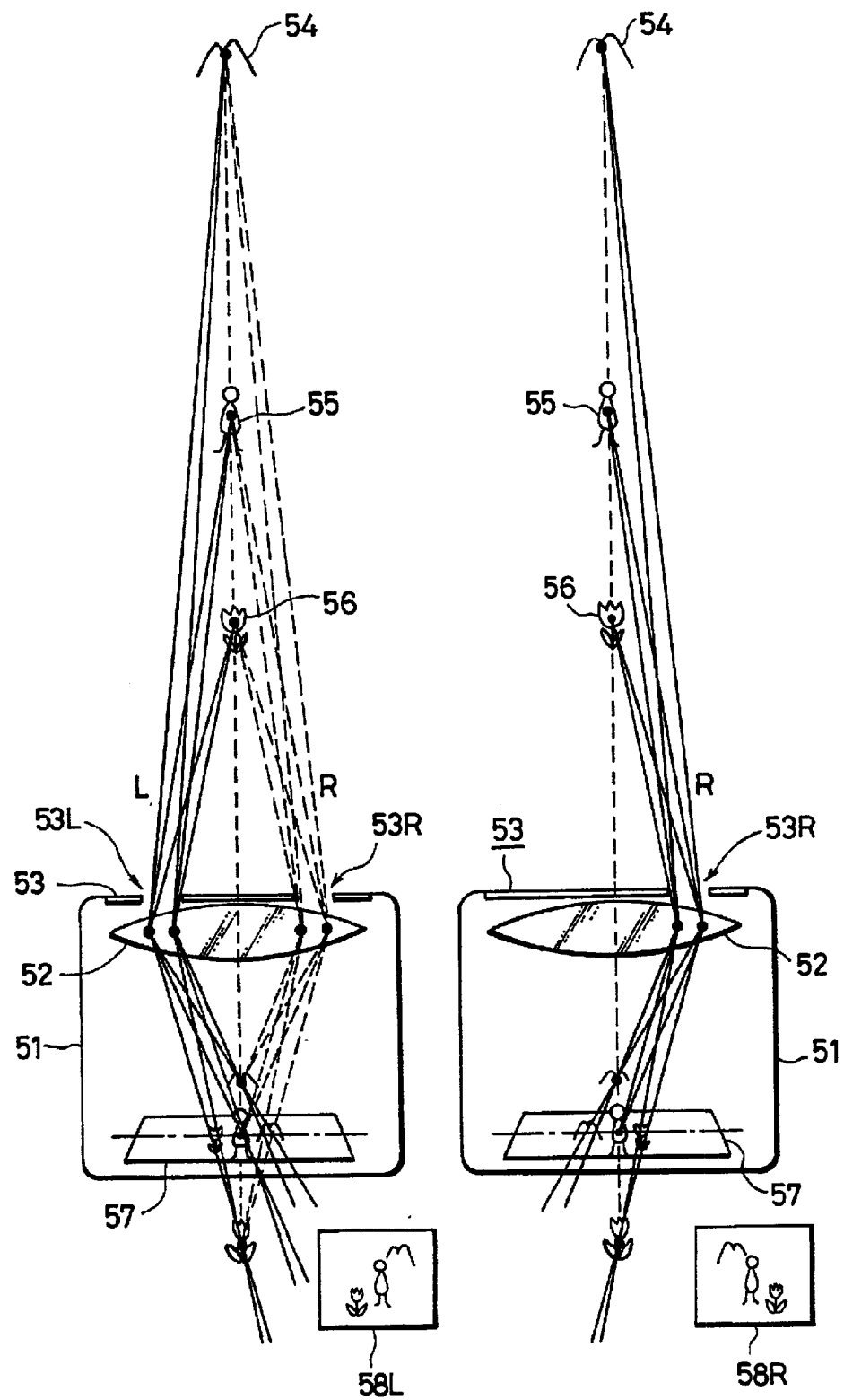

STEREOSCOPIC ZOOM LENS WITH SHUTTER ARRANGED BETWEEN FIRST AND SECOND LENS GROUPS

BACKGROUND OF THE INVENTION

1. Field of the Invention

The present invention relates to a lens unit for use in camera and a camera preferably applied for a video camera, and more particularly to a lens unit preferably used for taking stereoscopic pictures and camera thereof.

2. Description of the Related Art

Recently, various camera structures have been proposed as the stereoscopic television camera.

In this stereoscopic cameras, there are two-camera type in which a picture for the right eye and a picture for the left eye are taken with two cameras and a single lens type in which pictures for the right eye and left eye are taken with a single camera.

In case of the two-camera type, a stereoscopic image is created by generating a parallax between pictures from the two cameras.

On the other hand, in case of the single lens stereoscopic system, a phenomenon that a parallax is generated in a large lens also is utilized.

Thus, in the single lens stereoscopic system, as shown in FIG. 16, an optical shutter 53 for shielding the divided right and left portions are provided in front of a lens 52 of the camera 51. An optical path is divided to two sections by the optical shutter 53 and pictures are taken by switching over right and left optical paths by every vertical or horizontal operation.

In FIG. 16, only the right optical path is indicated in the right half. Then, the left optical path is indicated in the left half with solid line while the right optical is indicated with dot line in order to compare.

With this structure, an image for the right eye for a stereoscopic picture is taken by opening a right eye shutter 53R and an image for the left eye is taken by opening a left eye shutter 53L.

In FIG. 16, a focal point is placed on an object 55 in an intermediate distance (for example, man) so that the object 55 is in focus on an image pickup plane 57.

At this time, an object (for example, mountain) 54 farther from the focal point 55 is in focus in front of the image pickup plane 57 so that a blurred image is formed on the image pickup plane 57 and represented on an opposite side to the shutter through which the corresponding light passes, that is, the left eye image is formed to the right relative to the center while the right eye image is formed to the left relative to the center.

An object (for example, flower) 56 nearer the focal point is in focus behind the image pickup plane 57 so that a blurred image is formed on the image pickup plane 57. Then, that object is represented on the same side as the shutter through which the corresponding light passes, that is, the left eye image is formed to the left relative to the center while the right eye image is formed to the right relative to the center.

Consequently, the left eye image 58L and the right eye image 58R formed on the image pickup plane 57 are represented at deviated positions to the right and left corresponding to a distance to the object even if it is located just in front.

By using this phenomenon as parallax information and then watching two images in combination therewith, a stereoscopic image can be produced depending on a distance up to the object.

However, the above described stereoscopic television camera based on the single-lens stereoscopic system cannot be applied to a system having zooming function by a zoom lens sufficiently.

If the above described shutter for switching the right and left images is disposed in front of lenses including the zoom lens, although there is no problem on the telescopic side of the zoom, vignetting or shading, in which the right or left edge is chipped (becomes invisible) may be sometimes generated on each of the right and left screens L, R as shown in a diagonal line of FIG. 17.

If such a vignetting is generated, use of the zoom lens is limited, for example, the zoom range has to be narrowed.

Thus, it is difficult to apply the zoom function to the stereoscopic camera.

SUMMARY OF THE INVENTION

To solve the above described problem, the present invention intends to provide a lens unit and camera capable of achieving both the stereoscopic television function and the zoom function at the same time.

To achieve the above described object, according to an aspect of the present invention, there is provided a lens unit comprising: at least a lens including a zoom lens; a light quantity adjusting means; an electronic optical shutter provided on a subsequent stage of the zoom lens; and an optical shutter driving portion for controlling the electronic optical shutter to an opening of a predetermined pattern.

Further, according to another aspect of the present invention, there is provided a camera comprising: at least a lens including a zoom lens; a light quantity adjusting means; an electronic optical shutter provided on a subsequent stage of the zoom lens; and an optical shutter driving portion for controlling the electronic optical shutter to an opening of a predetermined pattern.

According to the structure of the present invention, because the electronic optical shutter is provided on a subsequent stage of the zoom lens, a screen edge is never chipped in taking pictures at a wide angle, so that the zoom function can be exerted sufficiently.

Further, because the electronic optical shutter is employed as the optical shutter, fine opening patterns can be switched over quickly.

Still further, because there is provided an optical shutter driving portion for controlling the electronic optical shutter to an opening of a predetermined pattern, the opening can be controlled to any pattern.

BRIEF DESCRIPTION OF THE DRAWINGS

FIG. 14 are diagrams for explaining a case in which a deviation between right and left pictures is changed;

FIG. 15 are diagrams showing how a picture is seen when the deviation between right and left pictures is changed;

FIG. 16 is a diagram showing a stereoscopic camera optical system of a conventional single-lens stereoscopic type; and FIG. 17 is a diagram showing a phenomenon that ends of a screen in the stereoscopic camera of FIG. 16 are missed.

DETAILED DESCRIPTION OF THE PREFERRED EMBODIMENTS

Figure 1:
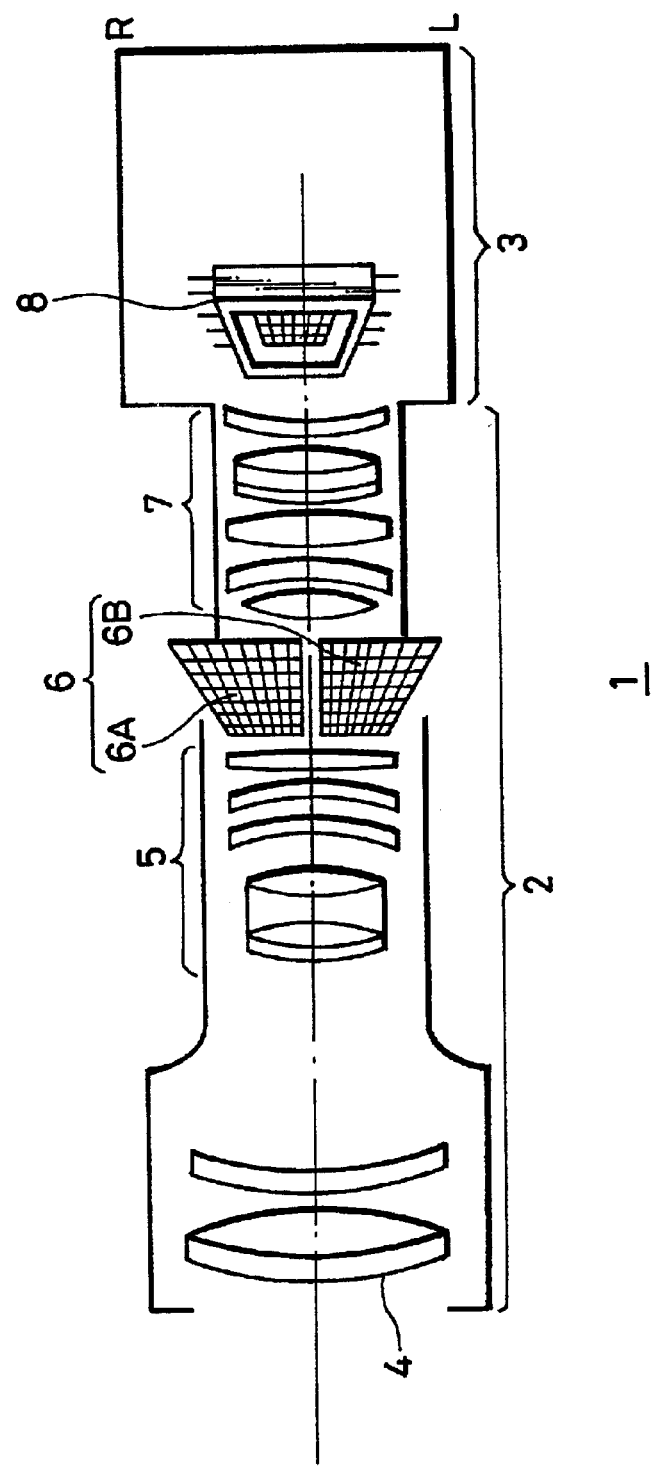
FIG. 1 is a schematic structure diagram of a stereoscopic camera optical system according to an embodiment of the present invention.

The present invention concerns a lens unit comprising at least a lens including a zoom lens, a light quantity adjusting means, an electronic optical shutter provided on a subsequent stage of the zoom lens, and an optical shutter driving portion for controlling the electronic optical shutter to an opening of a predetermined pattern.

Further, the lens unit of the present invention includes a diaphragm for changing the size of an opening mechanically by means of the light quantity adjusting means.

Still further, the lens unit of the present invention includes a filter as the light quantity adjusting means.

In the lens unit of the present invention, the electronic optical shutter is disposed in the vicinity of the light quantity adjusting means.

In the lens unit of the present invention, the electronic optical shutter is comprised of a liquid shutter.

In the lens unit of the present invention, its predetermined pattern can be changed alternately between a pattern having an opening at the left side and a pattern having an opening at the right side.

In the lens unit of the present invention, the predetermined pattern is changed corresponding to a zoom state of the zoom lens.

In the lens unit of the present invention, the electronic optical shutter acts as a light quantity adjusting means at the same time.

In the lens unit of the present invention, the electronic optical shutter which acts as the light quantity adjusting means is comprised of a liquid shutter.

The present invention concerns a camera comprising at least a lens including a zoom lens, a light quantity adjusting means, an electronic optical shutter provided at a subsequent stage of the zoom lens and an optical shutter driving portion for controlling the electronic optical shutter to a predetermined opening.

The camera of the present invention includes a diaphragm for changing the size of an opening mechanically by means of the light quantity adjusting means.

In the camera of the present invention, the light quantity adjusting means is a filter.

In the camera of the present invention, the electronic optical shutter is disposed in the vicinity of the light quantity adjusting means.

In the camera of the present invention, the electronic optical shutter is comprised of a liquid shutter.

In the camera of the present invention, the predetermined pattern is changed alternately between a pattern having an opening at the left side and a pattern having an opening at the right side.

In the camera of the present invention, the predetermined pattern is changed corresponding to the zoom state of the zoom lens.

In the camera of the present invention, the electronic optical shutter acts as the light quantity adjusting means at the same time.

In the camera of the present invention, the electronic optical shutter which acts as the light quantity adjusting means is comprised of the liquid shutter.

In the camera of the present invention, the light quantity adjusting means is an electronic shutter for a solid image pickup device.

FIG. 1 shows a schematic structure diagram of a stereoscopic camera optical system according to an embodiment of the present invention.

This stereoscopic camera 1 is comprised largely of a lens unit 2 containing a large number of lenses and a camera main body 3 including the solid image pickup device 8.

The lens unit 2 is comprised of a zoom lens 4 having magnification changing function (zoom function), a first lens group 5 and a second lens group 7.

According to this embodiment, a liquid shutter 6 is disposed as an electronic shutter between the first lens group 5 and the second lens group 7 in the lens unit 2.

This liquid shutter 6 is divided to two sections 6A and 6B corresponding to right and left images across the center of the light path. A predetermined operation, for example, opening and closing of the two sections 6A and 6B alternately is carried out by a liquid driving portion (not shown).

That is, according to this embodiment, the optical shutter (53 in FIG. 16), which switches over right and left images in the conventional single-lens stereoscopic type camera, is transferred to between the first lens group 5 and the second lens group 7, namely, near a position where an ordinary diaphragm mechanism exists.

Then, like a structure shown in FIG. 16, the light path of the lens is divided to two sections, right and left, so that an image for the right eye of a stereoscopic picture is taken by opening a shutter 6A for the right eye image and an image for the left eye is taken by opening a shutter 6B for the left eye image. Consequently, a difference of position between the right eye image and left eye image moves like the parallax of the eyes.

Because the liquid shutter 6 is disposed at the position where the diaphragm is originally located, even only half optical path of the divided shutter portion enables to secure a full screen without any chipping of the right and left images.

Thus, if the liquid shutters 6A and 6B are driven so that the right half R and the left half L are switched so as to allow light to pass through alternately for each field, both the left image and the right image are obtained in each vertical scanning period (1 V).

Here, an object located at an unfocused position becomes a blurred image on an image pickup plane.

By switching the right and left halves of the liquid shutter 6, a blurred image on the right half of the zoom lens 4 and a blurred image on the left half can be separated from each other.

Even a difference in position between the blurred images provides sufficient stereoscopic parallax information.

For example, even a 12-power lens for ⅔ inch is capable of securing a parallax of about 10–15 mm.

Although a distance between human eyes is 60–65 mm, even a parallax which is ¼ thereof or less provides a sufficient stereoscopic parallax information.

In other words, if the parallax is small, there is an advantage that a stereoscopic image easy to see with less fatigue can be secured.

According to this embodiment, no ordinary diaphragm mechanism is provided, and instead, the liquid shutter 6 functions as the light quantity adjusting means at the same time.

For the liquid shutter 6 to be used as the light quantity adjusting means at the same time, the size of an opening pattern of the liquid shutter 6 is changed so as to adjust an incident light quantity.

Figure 2:
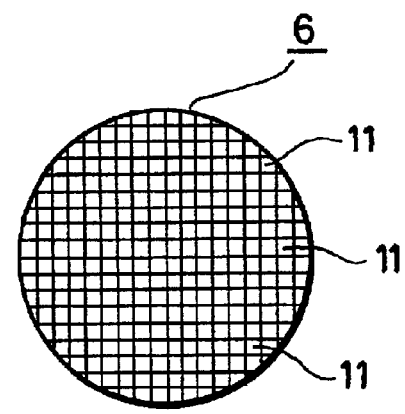
FIG. 2 is a diagram showing a structure of a liquid shutter of FIG. 1.

Particularly if the liquid shutter 6 is constructed of fine matrix-like pixels 11 as shown in FIG. 2 and each pixel is driven separately, a desired opening pattern can be formed. Thus, the size of the opening pattern can be changed easily so as to adjust the incident light quantity.

Two opening patterns of the liquid shutter 6 corresponding to the right and left images are not indicated at the same time because they are switched over.

Therefore, for example, the two opening patterns can possess an overlapping portion. Particularly, if the liquid shutter 6 is constituted of such fine matrix-like pixels 11 as shown in FIG. 2, an opening pattern having the overlapping portion can be obtained easily.

Figure 3:
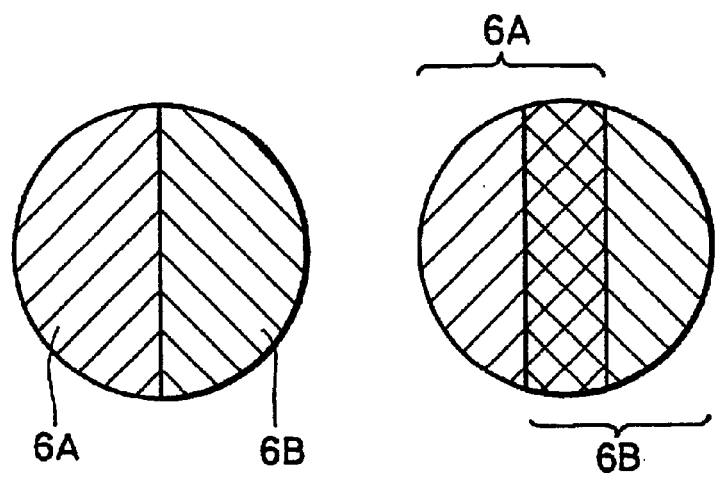
FIG. 3A is a diagram showing a case in which right and left patterns of the liquid shutter are separated.
FIG. 3B is a diagram showing a case in which the right and left patterns of the liquid shutter overlap each other.

FIG. 3A shows a case in which the right and left patterns 6A, 6B of the liquid shutter 6 are divided completely so that they do not overlap each other as shown in FIG. 1.

On the other hand, FIG. 3B shows a case in which the two opening patterns 6A, 6B overlap each other partially. Even if the opening patterns 6A, 6B overlap each other, they can be made to correspond to the right and left images by switching over.

FIG. 4 shows a case in which the opening pattern of the liquid shutter 6 is changed depending on the zoom condition of the zoom lens 4. In FIG. 4, the sizes of the opening patterns are the same and a distance between the two opening patterns is changed corresponding to the zoom condition.

Figure 4A:
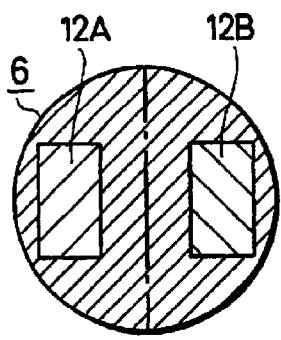
FIGS. 4A–C are diagrams showing a case in which an opening pattern of the liquid shutter is changed corresponding to a zoom condition of a zoom lens.
Figure 4B:
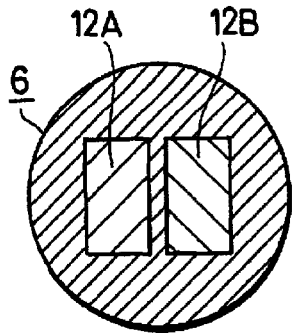
Figure 4C:
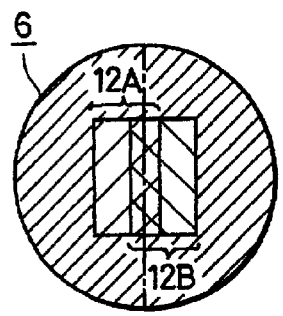

In case of taking pictures at a wide angle, two opening patterns 12A, 12B are separated as they are far from each other as shown in FIG. 4A. In case of telescopic photography, the distance between the two opening patterns 12A and 12B are made short as shown in FIG. 4B. In case of super telescopic photography, the two opening patterns 12A, 12B are made to overlap each other as shown in FIG. 4C.

If the two opening patterns 12A, 12B are separated with an increased distance as shown in FIG. 4A, the parallax becomes easy to secure.

Because the parallax is stressed more if the zoom is intensified, the overlap pattern, which makes it difficult to form the parallax, is employed as a degree of the super telescopic photography is intensified. Conversely, such a pattern, which facilitates to secure the parallax, is employed as a degree of the wide angle photography whose focal distance is short is intensified.

FIG. 5 shows a case in which actually the light quantity adjusting means is actuated by the liquid shutter 6.

In FIG. 5, two opening patterns 13A, 13B are variable in size so that the incident light quantity is also variable.

Figure 5A:
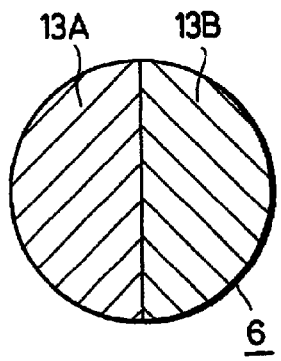
FIGS. 5A–C are diagrams showing an example in which light quantity adjusting means of the liquid shutter is operated.
Figure 5B:
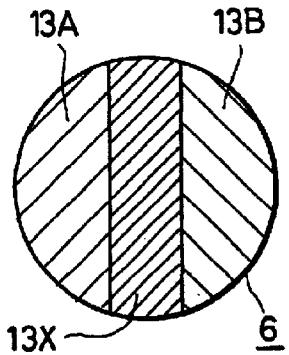

FIG. 5A indicates a full opening condition. The opening patterns 13A, 13B are semi-circles which are obtained by dividing the same circle as FIG. 3A to two sections. FIG. 5B indicates a state in which the incident light quantity is squeezed a little. There is a closed portion 13X between the two opening patterns 13A and 13B, which does not allow light to pass through.

Figure 5C:
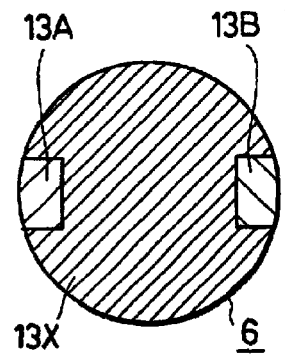

FIG. 5C indicates a state in which the incident light quantity is squeezed to some extent. The closed portion 13X occupies largely so that small opening patterns 13A, 13B exist on the right and left ends.

By changing the sizes of the opening patterns 13A, 13B as described above, the incident light quantity can be changed.

Preferably, it is so constructed to provide the camera with an exposure meter or the like so that the size of the opening pattern of the liquid shutter 6 is changed automatically or manually corresponding to a measured value to adjust the incident light quantity.

In the meantime, it is permissible to change three opening patterns shown in FIGS. 5A–5C gradually or it is also permissible to change the size of the opening pattern including middle opening patterns of these continuously.

By using the liquid shutter 6, the liquid shutter can be driven easily so as to change the size continuously.

FIG. 6 shows other example of the operation of the light quantity adjusting means by the liquid shutter 6.

According to the example shown in FIG. 5, the right and left opening patterns 13A, 13B are departed from each other successively with an increased distance therebetween as the opening is squeezed. According to the example shown in FIG. 6, each gravity center of the opening pattern is substantially maintained.

Figure 6A:
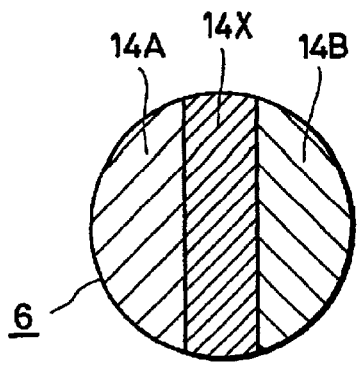
FIGS. 6A, B are diagrams showing another example in which the light quantity adjusting means of the liquid shutter is operated.
Figure 6B:
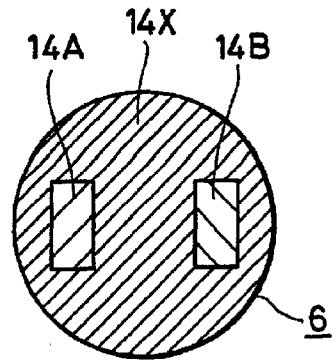

FIG. 6A shows a case of a large opening. Right and left opening patterns 14A, 14B are large opening patterns near semicircle. There is a closed portion 14X between the two opening patterns 14A and 14B, which does not allow light to pass through. FIG. 6B indicates a case of a small opening. Gravity center positions of the right and left opening patterns 14A, 14B are substantially the same as FIG. 6A.

In this case also, an intermediate condition between FIGS. 6A and 6B is possible and the size of the opening can be changed continuously.

Figure 7:
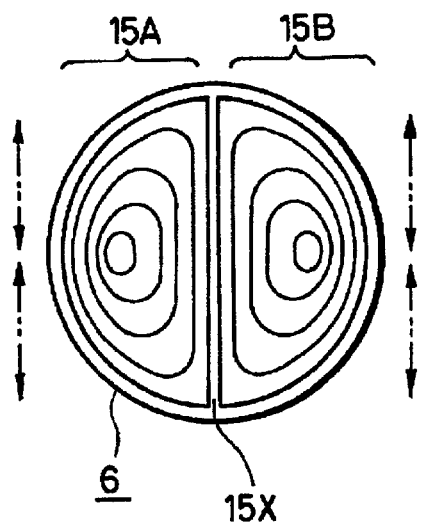
FIG. 7 is a diagram showing still another example in which the light quantity adjusting means of the liquid shutter is operated.
Figure 8:
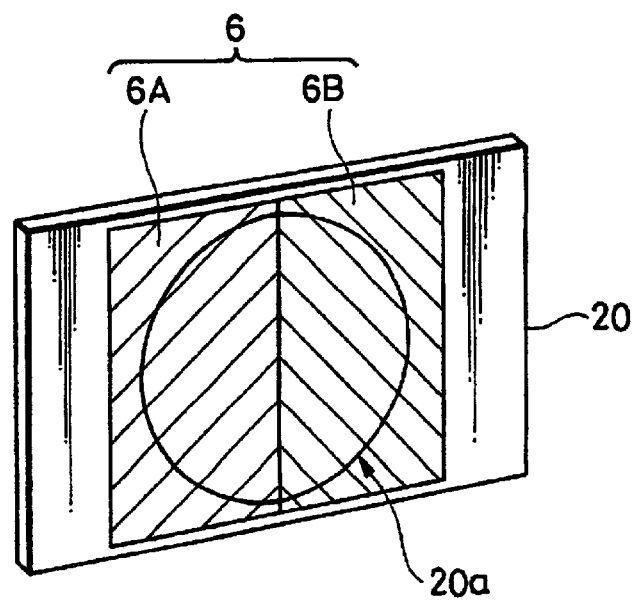
FIG. 8 is a diagram showing schematically a relation of disposition between a mechanical shutter if provided and the liquid shutter.

FIG. 7 shows a pattern in which the size of the opening is variable around the position of the gravity center as other example for carrying out the operation of the light quantity adjusting means.

The sizes of the right and left openings 15A, 15B change as indicated by dotted line.

Although the camera shown in FIG. 1 is so constructed that an electronic type optical shutter, for example, the liquid shutter 6 functions as the light quantity adjusting means at the same time, it is permissible to provide the camera with a light quantity adjusting means which is a separate body from the electronic type optical shutter.

The structure in which a separate light quantity adjusting means is provided is as follows.

1) Structure in which a mechanical diaphragm for changing the size of the opening mechanically is provided
2) Structure in which a diaphragm by ND (neutral density) filter or the like is provided or the light quantity is adjusted by a rotary polarizing plate
3) Structure in which the aperture is adjusted by an operation of the electronic shutter under control of the solid image pickup device of the camera First, if it is intended to provide a mechanical diaphragm, the light quantity adjusting means (mechanical diaphragm) 20 is provided near the liquid shutter 6 as shown in FIG. B. Then, the light quantity adjusting means 20 and the liquid shutter 6 are disposed between the first lens group 5 and the second lens group 7 shown in FIG. 1, that is, at a position where an ordinary diaphragm mechanism should be disposed.

Then, the incident light quantity to the liquid shutter 6 is regulated by an opening 20a provided on the light quantity adjusting means 20.

Next, an embodiment of a structure incorporating this mechanical diaphragm will be described below. As shown in FIG. 9, four blade-like shield plates 21a–21d are mounted in the vicinity of the liquid shutter 6 (6A, 6B) such that an end of each thereof is fixed by a pin 22 so as to construct a light quantity adjusting means. By rotating the shield plates 21a–21d around the fixed end (pin) 22, the size of the opening is changed so as to change the quantity of light passing through.

Figure 9A:
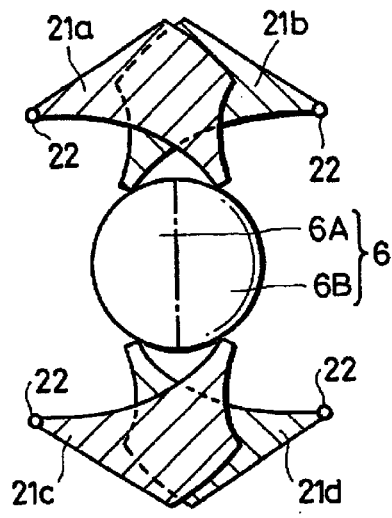
FIGS. 9A–D are diagrams showing an example in which the mechanical diaphragm is provided.

FIG. 9A indicates a full opening condition, in which the shield plates 21a–21d are located out of the liquid shutter 6.

Figure 9B:
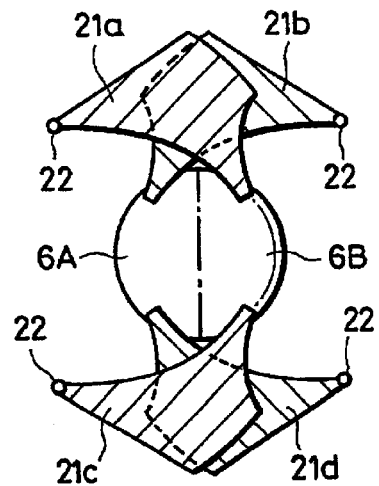

FIG. 9B indicates a little closing condition, in which part of the shield plates 21a–21d shields the liquid shutter 6.

Figure 9C:
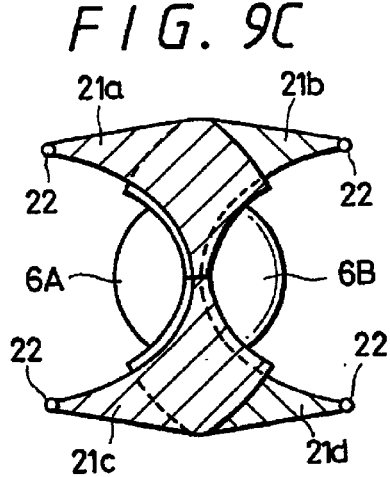

FIG. 9C indicates that the shield plates are further closed and front ends of the four shield plates 21a–21d overlap each other in the center so that about 1/3 of the liquid shutters 6A, 6B are hidden.

Figure 9D:
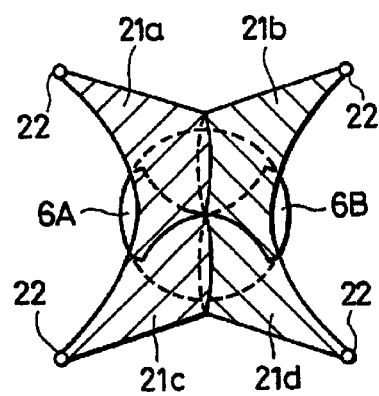

FIG. 9D indicates that the shield plates are closed most and the four shield plates 21a–21d overlap each other most so that most part of the liquid shutters 6A, 6B are hidden.

By incorporating the solid image pickup device 8 in the camera 1 shown in FIG. 1, the shutter can be operated by a driving of the solid image pickup device 8. Therefore, the mechanical diaphragm does not always have to be closed fully unlike the film type camera.

Further, because the camera mentioned in the present invention is used mainly as a video camera, its picture-taking operation can be turned on/off with a switch, button or the like. Therefore, it is possible to produce a state having no incident light quantity even if the mechanical diaphragm is not closed fully.

Next, other embodiment of the mechanical diaphragm will be described below.

In this mechanical diaphragm, openings are formed in a rotary or slidable part and then by moving this part, the openings are variable.

Figure 10:
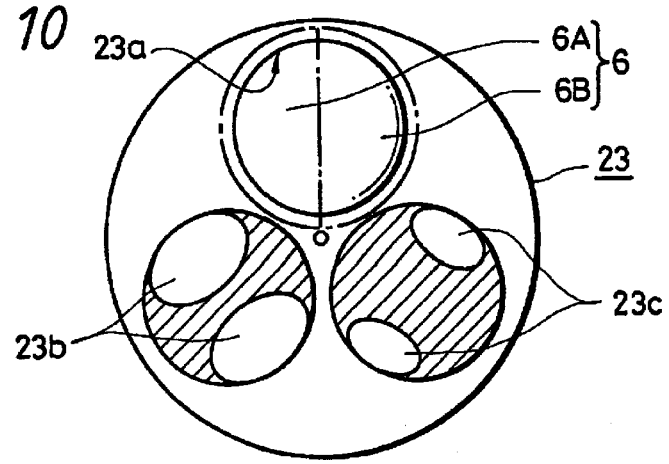
FIG. 10 is a diagram showing another example in which the mechanical diaphragm is provided.

In FIG. 10, three openings 23a, 23b, 23c are formed in the rotary disc-shaped part 23 and by rotating this part 23 around an axis thereof, the three openings 23a, 23b, 23c are switched over.

According to the opening pattern of the liquid shutter 6 in this case, two opening patterns 6A, 6B produced by cutting a circle with respect to the center thereof as indicated by dotted line are indicated alternately. A first opening 23a is substantially fully open and this opening is relatively smaller than the liquid shutter 6 (6A, 6B).

In a second opening 23b, about 1/3 of the liquid shutter 6 is hidden.

A third opening 23c is a smaller opening than the second opening 23b.

Figure 11:
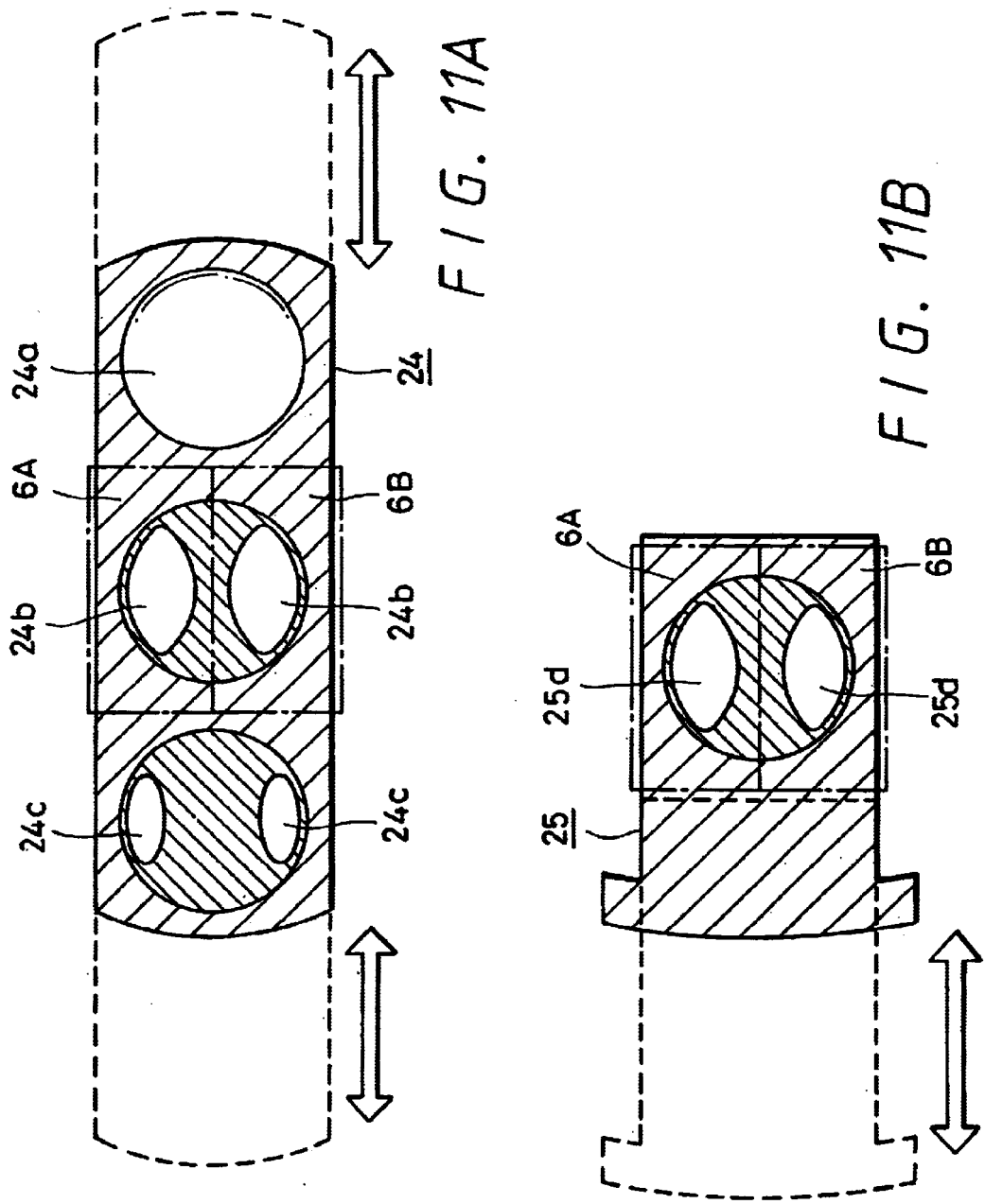
FIGS. 11A and 11B are diagrams showing still another example in which the mechanical diaphragm is provided.

FIG. 11 shows an embodiment in which an opening is formed in a slidable part 24. In FIG. 11A, three openings 24a, 24b, 24c each having the same shape as FIG. 10 is formed in the slidable part 24. By sliding this part in an arrow direction, the three openings 24a, 24b, 24c are switched over.

In FIG. 11B, an opening 25d having the same shape as the second opening 23b of FIG. 10 is formed and then, by sliding this part 25 in an arrow direction, either a condition in which about 1/3 of the liquid shutter 6 is hidden by this opening 25d or a fully open state in which the part 25 is removed from before the liquid shutter 6 is selected.

Next, an embodiment in which the filter is used as the light quantity adjusting means will be described below.

Figure 12:
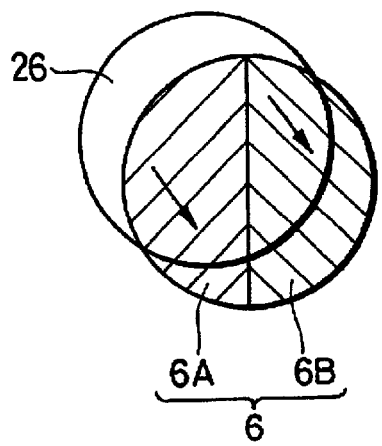
FIG. 12 is a diagram showing an example in which the filter is used as the light quantity adjusting means.

FIG. 12 schematically shows a case in which the filter 26, for example, the ND filter is provided just in front of the liquid shutter 6. Light passing through the filter 26 enters the respective parts 6A, 6B of the liquid shutter 6.

By attaching or removing the filter 26 or replacing with another filter having a different transmittance, the light quantity can be changed.

Figure 13:
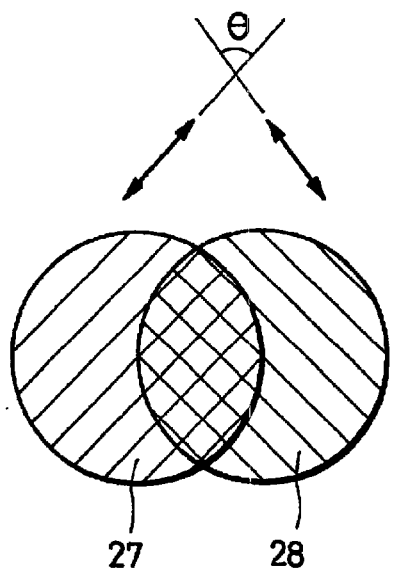
FIG. 13 is a diagram showing another example in which the filter is used as the light quantity adjusting means.

FIG. 13 schematically shows a case in which the polarizing filter, for example, the polarizing ND filter is employed. Two polarizing filters 27, 28 each having a polarizing direction as indicated by an arrow are used such that they overlap each other. In this case, by adjusting an angle θ produced by the polarizing directions of the two polarizing filters 27, 28, for example, by rotating at least one of the polarizing filters, the incident light quantity can be changed.

Because ordinarily, the polarizing plate is provided on the liquid shutter 6, it is permissible to so construct that one of the two polarizing filters 27, 28 of FIG. 13 is used as the polarizing plate of the liquid shutter 6.

In the meantime the filter 26 and polarizing filters 27, 28 do not always have to be disposed near the liquid shutter 6 unlike the mechanical diaphragm and instead, may be disposed before or after the zoom lens 4. At least in the construction shown in FIG. 1, the filter may be incorporated within an optical system in front of the solid image pickup device 8.

Next, an embodiment in which an electronic shutter composed of the solid image pickup device 8 is employed as a light quantity adjusting means will be described below.

If for example, a CCD solid image pickup device is employed as the solid image pickup device 8, unnecessary charge can be discharged to a substrate or a vertical CCD register by operating the electronic shutter so as to reduce accumulation time of a signal charge thereby making it possible to accelerate shutter speed.

If this is applied, the signal charge to be accumulated can be reduced by shortening the accumulation time, so that the same effect as when the incident light quantity is reduced by an ordinary light quantity adjusting means is produced.

Therefore, by changing a time interval of drive pulse which specifies the accumulation time, the incident light quantity can be changed.

Other solid image pickup device, for example, MOS type solid image pickup device, is capable of securing the same effect by achieving the electronic shutter operation in the same manner.

If the opening pattern of the liquid shutter 6 is made variable as described above, when it is intended to take pictures while moving from a light place to a dark place or from a dark place to a light place, the degree of the diaphragm can be changed continuously to correspond to changes of brightness.

Particularly if the liquid shutter 6 composed of the matrix-like pixels 11 is used, a finer degree of the diaphragm can be changed continuously as shown in FIG. 2.

Even if the mechanical diaphragm is used as the light quantity adjusting means, with the configuration shown in FIG. 9, the incident light quantity can be changed smoothly and continuously by rotating the four blade-like shield plates 21*a*–21*d*.

Further, if the filter is employed as the light quantity adjusting means, with the configuration shown in FIG. 13, the incident light quantity can be changed continuously and smoothly by rotating the two polarizing filters 27, 28 to change the angle θ produced by the polarizing directions. If the electronic shutter by the solid image pickup device 8 is employed as the light quantity adjusting means, the time interval of the pulse for the operation of the electronic shutter may be changed and therefore, the incident light quantity can be changed relatively easily.

Because according to this embodiment, the liquid shutter 6 is disposed on a subsequent stage to the zoom lens 4, occurrence of vignetting on the side of a wide angle of the zoom lens 4 can be suppressed.

Therefore, the zoom lens 4 can be used in entire zoom rate region from a wide angle side to a super telescopic side, like an ordinary camera, and thus, a stereoscopic photography can be carried out by the same handling for the ordinary camera.

Further, because single-lens stereoscopic system is employed, the parallax is not so large that a picture which does not tire the eyes can be obtained. An image which attracts an attention so that it is desired to be indicated is focused sharply, while places nearer or farther than that place is blurred to an appropriate extent, so that a person's viewpoint is fixed thereby making the eyes less tired.

If the opening pattern is changed so that the distance thereof becomes shorter on the telescopic side as shown in FIG. 4, an increase of the parallax on the telescopic side is prevented, so that an image which does not tires the eyes can be produced.

It is permissible to provide a portion corresponding to the second lens group 7 located at a subsequent stage of the liquid shutter 6 with a variable power lens system so as to carry out magnification conversion between the zoom lens 4 and the solid image pickup device 8.

Further, this variable power lens system may be so constructed to be detachable from the lens unit 2 for replacement and may be attached or detached depending on the specification of the camera 1 on which this lens unit is to be mounted or an object to be photographed.

If the variable power lens system is provided, it is possible to use a lens having a large aperture for the zoom lens 4 and an image pickup device having a small size for the solid image pickup device 8. Thus, the size of the camera main body 3 and power consumption of the solid image pickup device 8 can be reduced.

In the meantime, the driving circuit for the liquid shutter 6 may be mounted on the lens unit 2 or the camera main body 3.

If it is so constructed that the lens unit 2 incorporates the driving circuit for the liquid shutter 6, only by attaching the lens unit 2 to the camera main body 3, a desired opening pattern can be driven. Further, there is such an advantage that this can correspond to multiple kinds of the camera main bodies relatively easily.

By the way, a signal processing method for the right and left images taken with the camera 1 having the above described structure can be as follows, for example.

1) Upon taking pictures, a field is scanned in 1/60 seconds so as to obtain a signal for each field. With an odd field as the left image and an even filed as the right image, successive fields can be recorded with an ordinary VTR.

Upon displaying pictures, for example using two projectors together with a field memory, the left image is displayed with one projector and the right image is displayed with the other projector so that a stereoscopic image can be displayed. Alternatively, by driving a projector at double speed in combination with use of liquid shutter stereoscopic glasses, a stereoscopic image without any flicker can be obtained.

2) A double-speed camera is used for taking pictures. A field is scanned at 1/120 seconds and then, the left image and right image are switched over corresponding to every two field.

In this case, it is permissible to use the same speed (double speed) for storage into a memory or display of pictures. Alternatively, it is also permissible to convert to a single time speed and record with a VTR adapted for two screens.

3) A progressive camera is used for taking pictures.

This progressive camera scans all lines successively and therefore is different from an ordinary field scanning in which odd lines are scanned to obtain odd fields and after that, even lines are scanned to obtain even fields.

Then, the left image and right image are switched over every 1/60 seconds.

Reproduction is carried out at the same speed.

4) Upon taking pictures, a so-called high-vision specified (1125 lines) camera is used. A field is scanned in 1/60 seconds such that half of 1125 lines is scanned. The left and right images are switched over corresponding to each field.

For reproduction, the same high vision specified reproduction unit (VTR or the like) is used.

5) In this case also, the so-called high vision specified camera is used for taking pictures.

Thus, like 4), a field is scanned in 1/60 seconds such that half of 1125 lines is scanned. At the same time, the left image and right image are switched over corresponding to each field.

In this case, two ordinary NTSC specified (525 lines) reproduction units (VTR or the like) are used for reproduction, while the left image is reproduced with one reproduction unit and the right image is reproduced with the other reproduction unit.

In the meantime, it is permissible to use two NTSC specified VTRs instead of the high-vision specified VTRs.

In the case of 5), it is possible to use an optical disc having two recording layers for recording information as a recording medium for recording taken images.

Then, the right image may be recorded in one recording layer while the left image may be recorded in the other recording layer so that the respective images can be reproduced.

6) If it is intended to compress signals, the following method is available.

First of all, a picture is taken with the above described progressive camera.

Then, the left image and right image are switched over every ⅟₆₀ seconds.

An obtained signal is analog-digital converted and after that, respective signals for the left and right images are elongated so as to obtain ½ time speed.

Further, a sum signal of the left image and right image and a differential signal between the left signal and right signal are produced.

Because the single-lens stereoscopic system is employed according to the present invention, the difference between the left image and the right image is decreased as compared to the two-camera system, so that the difference signal can be compressed to some extent.

Therefore, the obtained difference signal is compressed and then recorded.

Upon reproduction, the left image and right image are created using the sum signal and compressed differential signal. It is permissible to use the left image or the right image as it is instead of the sum signal.

Because the differential signal is compressed with an optically slight difference between the right and left images according to the single-lens stereoscopic system, by compressing the differential signal, the total of the signals can be reduced. Consequently, recording into a memory, a recording medium or the like can be accelerated and a volume occupied by the image signals can be reduced.

In the meantime, the right and left image signals may not only be recorded in the recording medium as described above, but also may be transmitted from a transmitter as a broadcasting wave after a predetermined processing is carried out.

By receiving this broadcasting wave by means of a receiver and displaying the right and left images on the receiver, a stereoscopic image can be seen.

When displaying the right and left images taken with the stereoscopic camera 1 of this embodiment, it is possible to apply the structure of the stereoscopic television reproduction unit (disclosed in Japanese Patent Application Laid-Open No.SH064-22187) previously proposed by this inventor.

In this stereoscopic television reproduction unit, the right and left images taken according to the conventional single-lens stereoscopic system shown in FIG. 16 are deviated by a predetermined amount, that is, a distance between the human eyes or about ⅓ that distance and displayed.

By displaying (reproducing) the right and left images by deviating relative to each other, it is inhibited to display a distant view on a deeper side or display an object nearer the camera than a focal point such that it is projected unnaturally from a screen, so that the obtained image can be a natural stereoscopy.

Further, it is possible to so construct that the deviation amount of the right and left images corresponds to a state of a camera focus position. This case will be explained with reference to FIGS. 14, 15.

Figure 14A:
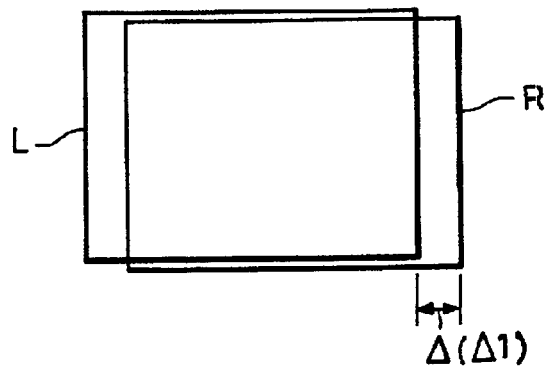
FIG. 14A is a diagram showing a case in which a focused position is near the camera.

More specifically, if the focal point is near the camera, the deviation amount Δ is a small value A1 as shown in FIG. 14A.

Figure 14B:
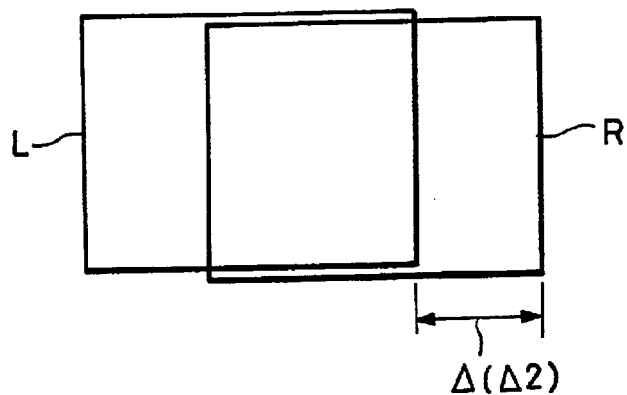
FIG. 14B is a diagram showing a case in which the focused position is far from the camera.

On the other hand, if the focal point is far from the camera, the deviation amount is a large value A2 as shown in FIG. 14B.

Consequently, an actually seen image is as shown in FIG. 15.

Figure 15A:
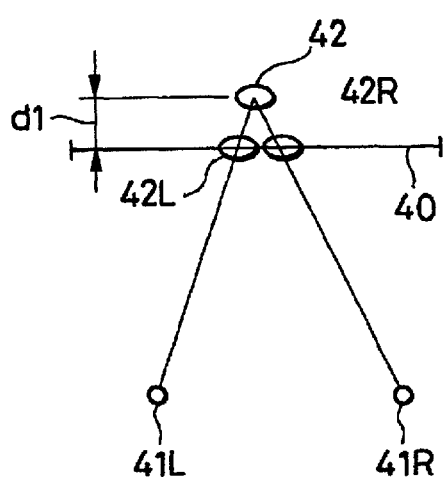
FIG. 15A is a diagram showing a case in which the focused position is near the camera.
Figure 15B:
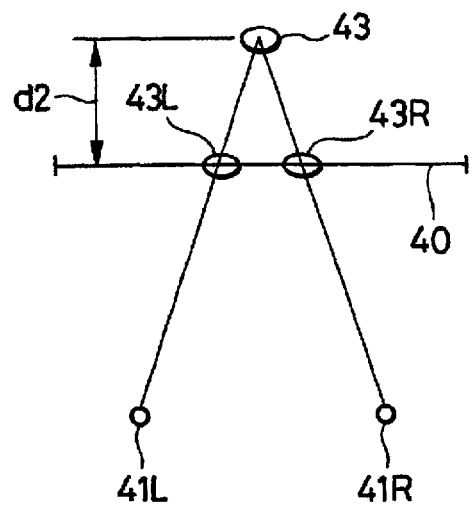
FIG. 15B is a diagram showing a case in which the focused position is far from the camera.

If the focal point is placed on a distance near the camera, a distance between the left image 42L and the right image 42R is short as shown in FIG. 15A, so that an image 42 from a left eye viewpoint 41L and a right eye viewpoint 41R is seen at a position with a short distance d1 from the screen 40. If the focal point is placed on a distance far from the camera, the distance between the left image 43L and the right image 43R is short as shown in FIG. 15B, so that an image 43 from the left eye viewpoint 41L as same as FIG. 15A and the right eye viewpoint 41R is seen at a position with a long distance d2 from the screen 40.

Thus, that distance changes corresponding to the focal point and a distance from the camera when the right and left image are seen.

Further, an object nearer the focal point is not seen such that it is unnaturally projected from the screen 40, so that it is seen as a stereoscopic image having a natural depth form a viewer.

Methods for deviating display positions of the right and left images with respect to each other include a mechanical method for, for example, deviating optical paths of two display units, an electric method for deviating signals of the right and left images electrically by, for example, delaying a horizontal synchronous signal of one image with respect to the other signal using a delay circuit and the like.

When the right and left images are allocated to, for example, two display units (projector, TV monitor or the like), polarizing filters each having a different angle are attached to the two display units. Then, the right and left images are overlapped by deviating positions where the right and left images are seen by the above described predetermined deviation amount Δ by the mechanical or electric method and the produced image is seen by wearing polarizing glasses. Meanwhile, it is permissible to use circular polarizing beam of left turn or right turn.

Alternatively, if it is intended to display the right and left images using a display unit (projector, TV monitor or the like) capable of switching over the polarizing angle by means of the liquid shutter, for example, the signals for the right and left images are deviated to each other electrically and the liquid shutter is switched over by a signal for identifying the right and left images, and then, a produced image is seen with the polarizing glasses.

If the focal distance is recorded as a signal together with the image signal, it is possible to so construct that the deviation amount Δ is changed and indicated corresponding to the focal distance at the time of taking picture when this image is reproduced.

For example, if a different pulse depending on the left image or the right image is contained in front of the image signal, it is possible to discriminate the right and left images by this pulse. Further, in this case, the deviation amount Δ is changed by increasing or decreasing a time difference of pulse between the left image signal and the right image signal.

More preferably, the camera 1 may be so constructed that the deviation amount Δ is changed automatically depending on a condition of the focal point of the zoom lens 4 of the camera 1.

More specifically, a means for detecting the condition of the focal point, for example, a potentiometer (potential difference meter for detecting a focus position of lens electrically) is provided at the lens unit 2. The condition of the focal point is detected by this potentiometer and the condition of the focal point is recorded as a time difference of signal as described above.

Further, by detecting the condition of the focal point using this potentiometer, it is possible to automatically change the distance between the right and left openings 12A, 12B of the liquid shutter 6 shown in FIG. 4 depending on the condition of the zoom.

If the right image and left image are overlapped with each other, an image produced by a single lens is represented. Thus, by displaying the right and left images such that they overlap each other, they can be seen as a plain flat image if the stereoscopic separating glasses is not worn.

If such stereoscopic glasses are not worn, a plain flat image is produced and if the stereoscopic glasses are worn, a stereoscopic image is generated. Thus, a very convenient compatibility is secured. However, at this time, a parallel shift between the right and left images is not carried out on the reproduction screen.

Particularly, if the right and left images are divided to halves or the right and left images overlap each other, an excellent compatibility is ensured between the stereoscopic image and the parallel image.

Although according to the above described embodiment, the liquid shutter is employed as the electronic optical shutter, it is permissible to use other electronic optical shutters in the present invention.

For example, a transparent ceramic display using optically transmissible ceramic such as PLZT ((Pb, La), (Zr, Ti)O 3; lead lanthanum zirconate titanate) or the like may be used as the electronic optical shutter.

In this ceramic display also, a predetermined pattern can be formed like the liquid shutter by activating respective matrix-like fine divided pixels as shown in FIG. 2.

If the PLZT is employed, the PLZT layer is sandwiched by transparent electrodes and the transparent electrodes are further sandwiched by polarizers.

Then, the driving frequency can be increased to more than 10 kHz, which is higher than the liquid shutter, so that a high speed switching operation is enabled.

Therefore, a shutter operation for switching over the right and left images for each line is enabled. Although the shutter operation for each line cannot be combined under a current CCD solid image pickup device, this is also made possible if the configuration of the image pickup device is changed.

According to the present invention, the switch of the right and left images by the electronic optical shutter may be carried out for each field, each frame or each line.

If the liquid shutter 6 is used as the electronic optical shutter, the above described switch for each field is more preferable because of the driving frequency of the liquid crystal. If PLZT or the like is employed as the electronic optical shutter, the above described switch for each line is possible.

Although according to the above described embodiment, the liquid shutter 6 which is an electronic optical shutter is disposed at the position where the ordinary diaphragm mechanism is provided, the electronic optical shutter of the present invention is not restricted to the position where the ordinary diaphragm mechanism should be disposed.

The electronic optical shutter may be disposed at any position within the optical system as long as it is located on a subsequent stage of the zoom lens having zoom function as a main lens and at a preceding stage of an image pickup portion such as the solid image pickup device or the like.

For example, the electronic shutter such as the liquid shutter 6 may be contained in, for example, the first lens group 5 or the second lens group 7.

Further, the second zoom lens having the zoom function may be disposed at the position where the second lens group 7 is located. In this case, the electronic optical shutter may be disposed on a preceding stage or a subsequent stage of the second zoom lens.

Further, the electronic optical shutter may be so constructed to be detachable and it may be so constructed to be attachable or detachable together with the lens group and the like.

As for the structure of the present invention, it is permissible to use the mechanical shutter for switching over the right and left images instead of the electronic optical shutter such as the liquid shutter 6.

However, the electronic shutter such as the liquid shutter 6 is more advantageous because it is capable of increasing the switching speed for the right and left openings more than the mechanical shutter.

Further, by using the liquid shutter 6 having the matrix-shaped pattern as shown in FIG. 2, there is such an advantage that any opening pattern can be formed.

The present invention is not restricted to the above described respective embodiments however, it may be modified in various ways within a scope not departing from the gist of the invention.

According to the present invention, a chipping of an image on the wide angle side of the zoom lens can be suppressed by providing with the electronic optical shutter on a subsequent stage of the zoom lens.

Therefore, it comes that the zoom lens can be used in entire zoom rate region from the wide angle side to the super telescopic side, so that a stereoscopic image can be taken in the same procedure as for an ordinary camera.

Further, because according to the present invention, the single-lens stereoscopic system is employed, the parallax is not so large, so that images which do not tire the eyes can be obtained.

Particularly if it is so constructed that the opening pattern is changed corresponding to the zoom condition of the zoom lens, increase of the parallax on the telescopic side can be suppressed.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A stereoscopic lens unit comprising:

a zoom lens;

a first lens group located subsequent to said zoom lens;

a second lens group located subsequent to said first lens group;

light quantity adjusting means arranged between said first lens group and said second lens group;

an electronic optical shutter arranged between said first lens group and said second lens group and including a first portion corresponding to a right image and a second portion corresponding to a left image; and an optical shutter driving portion for controlling said electronic optical shutter to open in a predetermined pattern, wherein said predetermined pattern changes corresponding to a zoom condition of said zoom lens.

2. The lens unit according to claim 1, wherein said light quantity adjusting means comprises a diaphragm for changing a size of an opening mechanically.

3. The lens unit according to claim 1, wherein said light quantity adjusting means comprises an optical filter.

4. The lens unit according to claim 1, wherein said electronic optical shutter is disposed near said light quantity adjusting means.

5. The lens unit according to claim 1, wherein said electronic optical shutter is composed of first and second liquid shutters.

6. The lens unit according to claim 1, wherein said predetermined pattern is switched to a pattern having an opening on the right and a pattern having an opening on the left alternately, corresponding to said first and second portions, respectively.

7. The lens unit according to claim 1, wherein said electronic optical shutter is utilized simultaneously as said light quantity adjusting means.

8. The lens unit according to claim 7, wherein said electronic optical shutter is composed of first and second liquid shutters.

9. A stereoscopic camera comprising:

a zoom lens;

a first lens group located subsequent to said zoom lens;

a second lens group located subsequent to said first lens group;

light quantity adjusting means arranged between said first lens group and said second lens group;

an electronic optical shutter arranged between said first lens group and said second lens group and including a first portion corresponding to a right image and a second portion corresponding to a left image; and an optical shutter driving portion for controlling said electronic optical shutter to open in a predetermined pattern, wherein said predetermined pattern changes corresponding to a zoom condition of said zoom lens.

10. The camera according to claim 9, wherein said light quantity adjusting means comprises a diaphragm for changing a size of an opening thereof mechanically.

11. The camera according to claim 9, wherein said light quantity adjusting means comprises an optical filter.

12. The camera according to claim 9, wherein said electronic optical shutter is disposed near said light quantity adjusting means.

13. The camera according to claim 9, wherein said electronic optical shutter is composed of first and second liquid shutters.

14. The camera according to claim 9, wherein said predetermined pattern is switched to a pattern having an opening on the right and a pattern having an opening on the left alternately, corresponding to said first and second portions, respectively.

15. The camera according to claim 9, wherein said electronic optical shutter is utilized simultaneously as said light quantity adjusting means.

16. The camera according to claim 15, wherein said electronic optical shutter is composed of first and second liquid shutters.

* * * * *